United States Patent [19]

Tanaka et al.

[11] 4,399,325

[45] Aug. 16, 1983

[54] DEMODULATING CIRCUIT FOR CONTROLLING STEREO SEPARATION

[75] Inventors: Kanji Tanaka, Gunma; Noboru Usui, Oota, both of Japan

[73] Assignees: Sanyo Electric Co., Ltd.; Tokyo Sanyo Electric Co., Ltd., both of Japan

[21] Appl. No.: 212,206

[22] Filed: Dec. 2, 1980

[30] Foreign Application Priority Data

Dec. 28, 1979 [JP] Japan .................................. 54-172100

[51] Int. Cl.³ .................................................. H04H 5/00
[52] U.S. Cl. ................................. 179/1 GM; 179/1 GE
[58] Field of Search ............. 179/1 GE, 1 GJ, 1 GM; 455/295, 312

[56] References Cited

U.S. PATENT DOCUMENTS

| | | | |
|---|---|---|---|
| 3,573,382 | 4/1971 | Feit et al. | 179/1 GM |
| 3,617,641 | 11/1971 | Feit et al. | 179/1 GE |
| 3,673,342 | 6/1972 | Muller | 179/1 GJ |
| 3,707,603 | 12/1972 | Limberg | 179/1 GE |
| 3,790,714 | 2/1974 | Ohsawa | 179/1 GM |
| 4,049,918 | 9/1977 | Ohsawa | 179/1 GJ |
| 4,251,690 | 2/1981 | Takahashi et al. | 179/1 GM |

Primary Examiner—A. D. Pellinen
Attorney, Agent, or Firm—Darby & Darby

[57] ABSTRACT

A demodulating circuit is capable of controlling stereo separation as a function of an electric field strength. An intermediate frequency signal not limited obtained from an intermediate frequency circuit is utilized as a signal representative of the level associated with the electric field strength. Stereo separation is discontinuously controlled as a function of the signal representative of the electric field strength. The separation is maintained in the possible maximum value in the region exceeding a predetermined value of the electric field strength but is abruptly decreased to a given value between a stereo state and a monaural state from the above described maximum value (stereo state) when the electric field strength becomes smaller than the above described predetermined value and the separation is changed as a function of the electric field strength in the region smaller than the above described value of the electric field strength.

19 Claims, 14 Drawing Figures

PRIOR ART

DEMODULATING CIRCUIT FOR CONTROLLING STEREO SEPARATION

BACKGROUND OF THE INVENTION

1. Field of the Invention

The present invention relates to a demodulating circuit in a stereo receiver. More specifically, the present invention relates to a demodulating circuit in a stereo receiver adapted such that stereo separation is changed as a function of the electric field strength thereby to improve a signal to noise ratio.

2. Description of the Prior Art

It has been well known that in a stereo receiver a signal to noise ratio on the occasion of a stereo state is worse than that on the occasion of a monaural state and in particular in a weak electric field a signal to noise ratio is considerably degraded as compared with a monaural state. On the other hand, considering an electric wave such as a broadcasting wave, points of a large electric field strength and points of a small electric field strength are at random distributed in accordance with the so called Rayleigh distribution. In particular, considering a case where an electric wave is interrupted by a building, for example, an electric field strength becomes extremely small. Accordingly, in the case of a stereo receiver such as a car stereo set which is borne on a vehicle so that a receiving point is changed from time to time, a signal to noise ratio is changed from time to time in accordance with such distribution of an electric field strength. At a point where an electric field strength is extremely small, mostly a noise component is received and becomes a hardly audible state. Therefore, one conventional approach has been proposed and put into practical use that in the case of an electric field strength smaller than a predetermined level a reception state is abruptly switched forcibly from a stereo state to a monaural state, whereby a signal to noise ratio is improved. However, such approach for instantaneously and forcibly switching from a stereo state to a monaural state involves disadvantages to be described subsequently. More specifically, (1) since a signal to noise ratio is abruptly changed, a discomfortable feeling is given to a listener, (2) since a sound is abruptly changed from a stereo state to a monaural state, a strange feeling is caused to a listener, and (3) another noise is caused incidental to the above described forcible switching from a stereo state to a monaural state.

Therefore, another approach for improving the above described disadvantages has been proposed. One example of such approach is disclosed in U.S. Pat. No. 3,673,342 issued June 27, 1972 to Muller and entitled "CIRCUIT ARRANGEMENT FOR IMPROVING THE SIGNAL-TO-NOISE RATIO OF A STEREO DECODER." A German counterpart of the above referenced U.S. Pat. No. 3,673,342 is German Pat. No. 19 39 422.

Figure 1:
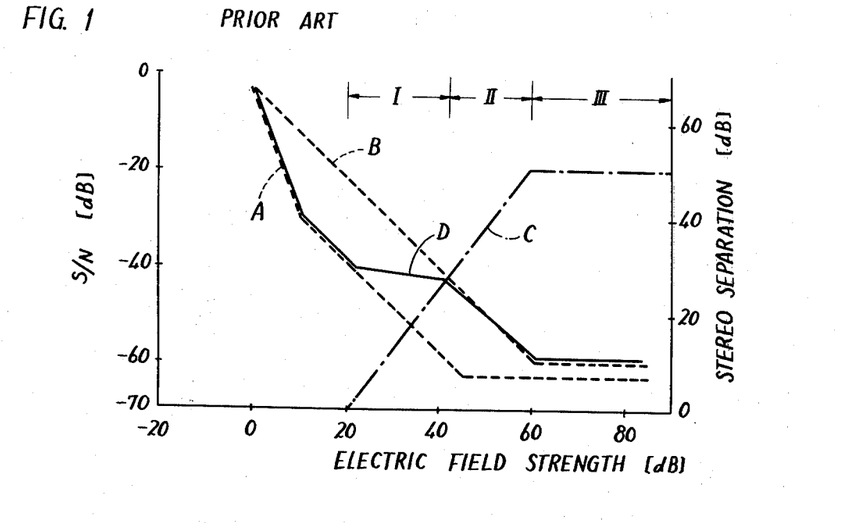
FIG. 1 is a graph showing a change of stereo separation and a signal to noise ratio with respect to an electric field strength in accordance with a prior art apparatus of interest to the present invention.

Referring to FIG. 1, the above described prior art will be briefly described. Meanwhile, referring to FIG. 1 and further FIGS. 3, 7, 8 and 9, curves shown therein have been illustrated as a line for simplicity of illustration. Therefore, it is pointed out that each of such figures is intended to merely show such curve in a qualitative manner.

Figure 2:
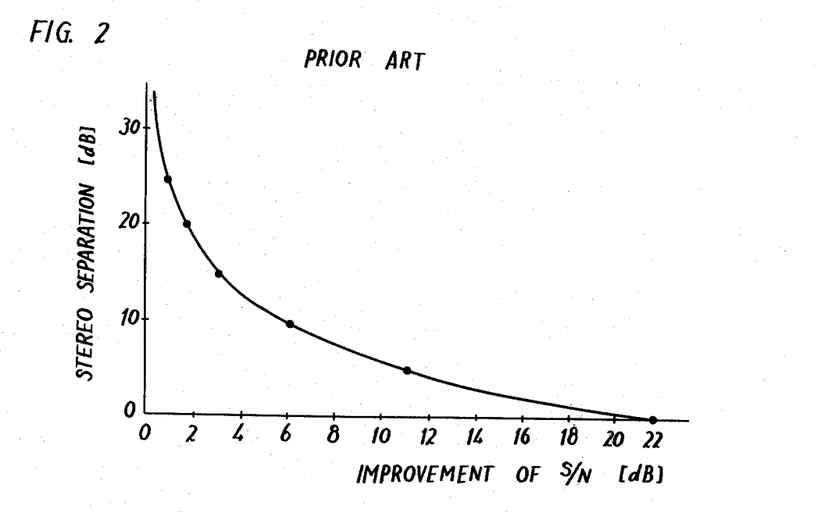
FIG. 2 is a graph showing an improvement in a signal to noise ratio with respect to a change in stereo separation in a general stereo receiver.

Referring to FIG. 1, the curve A shows a signal to noise ratio on the occasion of a monaural state and the curve B shows a signal to noise ratio of a stereo state. As shown in FIG. 2, a signal to noise ratio has a close relation with a stereo separation. More specifically, the smaller the stereo separation the better the signal to noise ratio. Accordingly, by adjusting a stereo separation a signal to noise ratio is improved. Therefore, the above referenced patent is aimed to improve a signal to noise ratio by controlling the same as shown by the curve D in FIG. 1 by controlling the separation as shown as the curve C in FIG. 1. More specifically, according to the prior art of the above referenced patent, a stereo separation is not degraded in the range III of an electric field strength, while a stereo separation is degraded in approximately reverse proportion to an electric field strength in the ranges I and II of an electric field strength. As a result, a signal to noise ratio is changed in accordance with the curve D and thus the above described three disadvantages (1), (2) and (3) are all eliminated. However, the above described prior art still involves a problem to be solved. This will be described in more detail with reference to FIG. 2. Referring to FIG. 2, the ordinate indicates a separation and the abscissa indicates an improvement of a signal to noise ratio in accordance with a change of the separation. As is seen from FIG. 2, the degree of improvement of a signal to noise ratio with respect to a change of a stereo separation is not necessarily in a proportional relation. Accordingly, a decrease in a stereo separation does not necessarily achieve an improvement in a signal to noise ratio. For example, even if the stereo separation is decreased from 50 dB to 40 dB, the improvement in a signal to noise ratio is approximately 0.2 dB at the most. Even if a separation is changed from 40 dB to 30 dB, the improvement in a signal to noise ratio is approximately 0.3 dB. In other words, according to the prior art of gradually decreasing a stereo separation in accordance with an electric field strength when the electric field strength becomes smaller than a predetermined value, as done in the above referenced patent, a situation could occur in the range II of an electric field strength shown in FIG. 1, in which a stereo separation is not good and an improvement in a signal to noise ratio is neither achieved. Therefore, particularly in the range II of an electric field strength, a disadvantage is left that only a separation is degraded although little influence is exerted even in a stereo state, as far as a signal to noise ratio is concerned. Accordingly, while the above described prior art achieves a sufficient effect in improving a signal to noise ratio in the range I of an electric field strength shown in FIG. 1, the same still involves another problem that conversely the separation is degraded in the range II of an electric field strength.

SUMMARY OF THE INVENTION

In brief, the present invention is adapted to maintain stereo separation undecreased until an electric field strength decreases to a predetermined value, to abruptly decrease stereo separation when an electric field strength becomes smaller than the above described predetermined value, and to change separation in accordance with an electric field strength in the range smaller than the above described predetermined value, whereby a discontinuous change of separation is imparted between the stereo state and the monaural state. The above described predetermined value of the electric field strength is selected to be a value which is sufficiently effective in improving a signal to noise ratio by changing stereo separation. According to the present invention, the other problem which is encountered with the previously referenced prior art is totally solved. Therefore, according to the present invention, a stereo receiver of a better signal to noise ratio is provided without degrading stereo separation as a whole.

In a preferred embodiment of the present invention, a signal representing a level of an electric field strength is threshold detected, so that a control signal for abruptly decreasing the magnitude of the electric field strength when the same becomes smaller than a predetermined electric field strength and stereo separation is controlled in accordance with the magnitude of the above described control signal. According to the preferred embodiment, a stereo receiver of a better signal to noise ratio is implemented with a more simplified circuit configuration without degrading stereo separation as a whole.

Accordingly, a principal object of the present invention is to provide a demodulating circuit in a stereo receiver, wherein a discontinuous change in separation is attained between the stereo state and the monaural state in accordance with an electric field strength, whereby a better signal to noise ratio is attained without degrading the degree of separation as a whole.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 3:
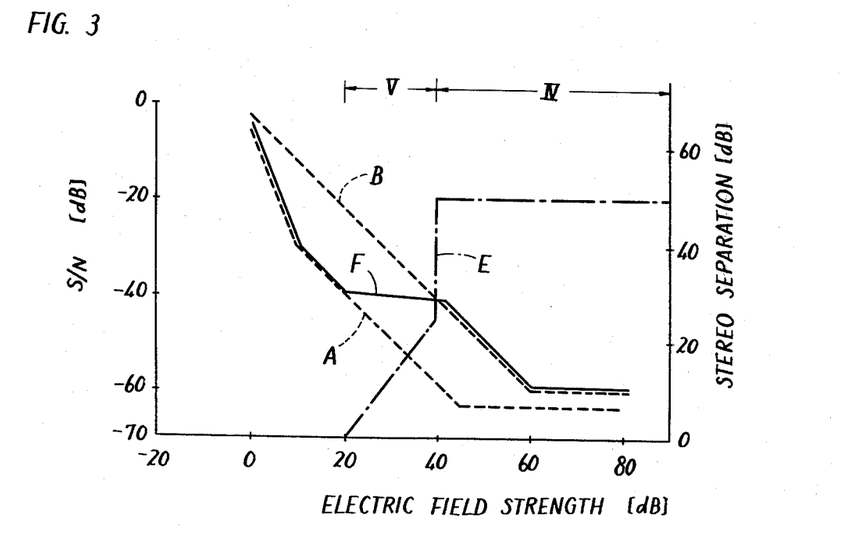
FIG. 3 is a graph for explaining the principle of the present invention and corresponds to the FIG. 1 graph.

FIG. 3 is a graph for explaining the principle of the present invention, in which a change of separation and a signal to noise ratio with respect to an electric field strength for reception. According to the present invention, stereo separation is maintained approximately a constant value irrespective of the electric field strength within the range IV of the electric field strength (corresponding to II+III of the previously described FIG. 1 graph). Meanwhile, the above described constant value may be a possible maximum value inherent to a stereo receiver. If and when the electric field strength becomes smaller than a given predetermined value, i.e. at the boundary between the ranges IV and V, the stereo separation is abruptly decreased to a given value. The above described given value lies between a stereo state and a monaural state as a matter of course. In the range of the electric field strength, the separation is changed in accordance with the electric field strength. More specifically, in the range V the stereo separation is made larger when the electric field strength is larger, while the stereo separation is made smaller when the electric field strength is smaller. Therefore, according to the present invention, a discontinuous separation change is achieved with respect to a change of the electric field strength, as shown by the curve E shown in FIG. 3.

By discontinuously changing the stereo separation as shown by the curve E, a signal to noise ratio as shown by the curve F in FIG. 3 can be attained. The curve F shown in FIG. 3 and the curve D shown in FIG. 1 exhibit approximately similar characteristics. Therefore, it would be appreciated that according to the present invention, an improvement in a signal to noise ratio is little changed as compared with a conventional one shown in FIG. 1, while only the stereo separation is considerably improved.

Figure 4:
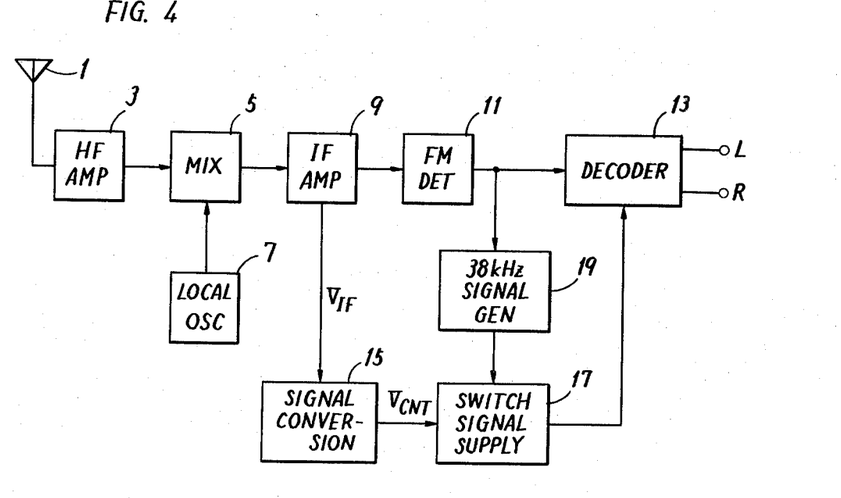
FIG. 4 is a block diagram for showing one embodiment of the present invention.
Figure 5:
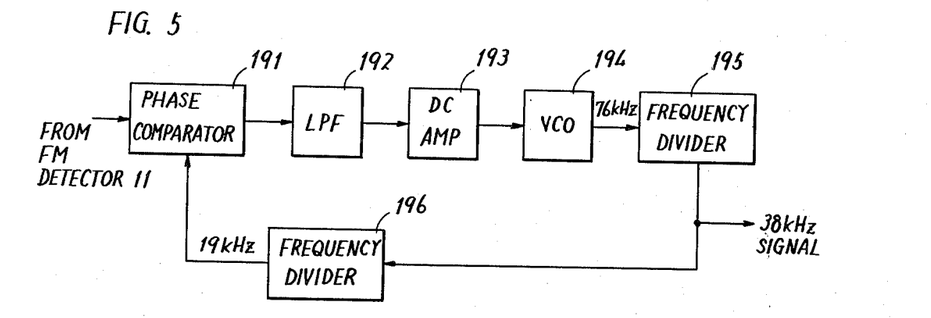
FIG. 5 is a block diagram showing in more detail a 38 kHz signal generator in FIG. 4.

FIG. 4 is a block diagram showing a preferred embodiment of the present invention. The embodiment shown in FIG. 4 comprises an FM stereo receiver. An electric wave as frequency modulated is received by an antenna 1. A high frequency signal received by the antenna I is amplified by a high frequency amplifier 3 and the output therefrom is applied to a mixer 5. The mixer 5 mixes the received high frequency signal with a local oscillation signal obtained from a local oscillator 7, thereby to provide an intermediate frequency signal. The intermediate frequency signal is amplified by an intermediate frequency amplifier 9 and is applied to an FM detector 11 such as a quadrature detector. The FM detector 11 detects the intermediate frequency signal, thereby to provide a low-frequency stereo composite signal. The stereo composite signal obtained from the FM detector is applied to a stereo decoder 13. On the other hand, an intermediate frequency signal as not amplitude limited by a limiter (not shown) is applied from the intermediate frequency amplifier 5 to a signal converter 15. A voltage signal $V_{IF}$ has the magnitude associated with the level of the intermediate frequency signal, i.e. the level of the electric field strength for reception. The signal converter 15 receives the voltage signal $V_{IF}$, thereby to provide a control signal voltage $V_{CNT}$. The control voltage signal $V_{CNT}$ is applied to a switching signal supply circuit 17. The switching signal supply circuit 17 is further supplied with a 38 kHz signal, i.e. a subcarrier signal, obtained from a 38 kHz signal generator 19. It is well known in the art that FM stereo composite signals include L&R channel information, L-R channel information suppressed carrier modulated on 38 kHz and a19 kHz pilot signal locked to the 38 kHz subcarrier at the transmitter. As shown in FIG. 5, the 38 kHz signal generator 19 comprises a phase locked loop. More specifically, the stereo composite signal obtained from the FM detector 11 is applied to one input of a phase comparator 191. The other input of the phase comparator 191 is connected to receive a signal obtained from a frequency divider 196 and the output of the phase comparator 191 provides a pulse having the pulse width associated with a phase difference of the two applied signals. The phase difference pulse is integrated by a low-pass filter 192 and the output therefrom is amplified by a direct current amplifier 193 and is applied to a voltage controlled oscillator 194 as a control voltage. The voltage controlled oscillator 194 makes oscillation at the frequency of 76 kHz. The 76 kHz signal obtained from the voltage controlled oscillator 194 is applied to the frequency divider 195, so that the frequency is divided at the frequency division ratio of ½. Accordingly, the output of the frequency divider 195 becomes a 38 kHz signal, i.e. a subcarrier signal. The output from the frequency divider 195 is applied to the previously described frequency divider 196.

Now returning to FIG. 4, the subcarrier signal being applied to the switching signal supply circuit 17 is the output from the circuit 195 shown in FIG. 5. The stereo decoder 13 decodes the stereo composite signal as applied as a function of the switching signal obtained from the switching signal supply circuit 17, thereby to provide a left channel signal L and a right channel signal R. Although not shown in FIG. 4, these two channel signals are applied to the sound producing circuits of the respective channels. Each of the sound producing circuits comprises a low frequency amplifier and a speaker connected thereto. As to be more fully described subsequently with reference to FIG. 6, the signal converter 15 generates a control voltage signal $V_{CNT}$ having a discontinuous change as a function of the voltage signal $V_{IF}$ of the magnitude proportional to the electric field strength, as shown in FIG. 7. The discontinuity of the control signal $V_{CNT}$ achieves discontinuity of stereo separation shown by the curve E in FIG. 3.

Figure 6:
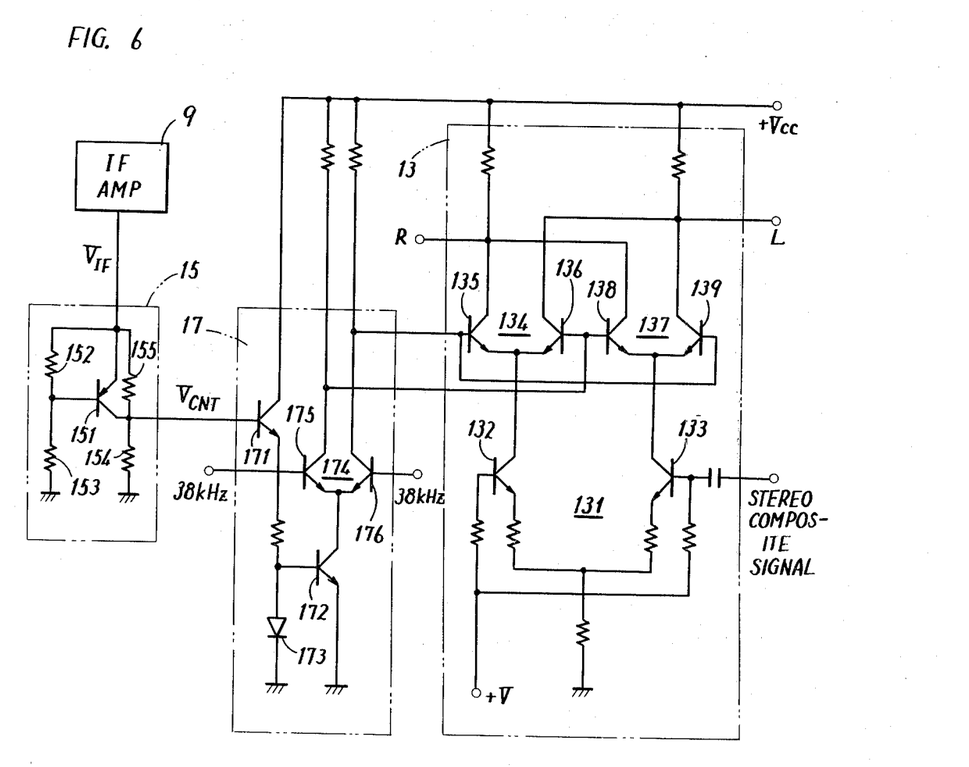
FIG. 6 is a schematic diagram showing in more detail the FIG. 4 embodiment.
Figure 7:
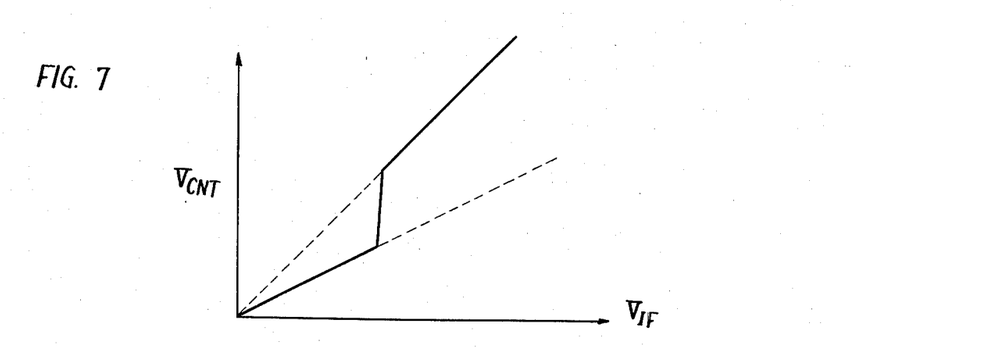
FIGS. 7, 8A and 8B and 9 are graphs for explaining the operation of the above described embodiment.

FIG. 6 is a schematic diagram showing in detail a preferred embodiment of the present invention. Referring to FIG. 6, only the signal converter 15, the switching signal supply circuit 17 and the stereo decoder 13 shown in FIG. 4 are illustrated in detail. The stereo decoder 13 of the embodiment shown is of a switching type and is adapted to receive a stereo composite signal obtained from the FM detector 11 (FIG. 4). The stereo decoder 13 comprises a first differential switching stage 134 including transistors 135 and 136, and a second differential switching stage 137 including transistors 138 and 139. The above described stereo composite signal is received by a differential amplifying stage 131 including transistors 132 and 133. The differential amplifying stage 131 provides the stereo composite signal to the above described first and second differential switching stages 134 and 137. The collector electrode of the transistor 135 of the first differential switching stage 134 is connected to the collector electrode of the transistor 138, where the right channel signal is obtained. The collector electrode of the transistor 139 of the second differential switching stage 137 is connected to the collector electrode of the transistor 136, where the left channel signal is obtained. The base electrodes of the transistors 135 and 139 are commonly connected and are adapted to receive one switching signal obtained from the switching signal supply circuit 17. The base electrodes of the transistors 136 and 138 are commonly connected and are adapted to receive the other switching signal from the circuit 17. Such stereo decoder 13 makes a switching operation of the stereo composite signal obtained from the differential amplifying stage 131 by means of the differential switching stages 134 and 137 as a function of the switching signal, thereby to provide the left channel signal and the right channel signal. Such stereo decoder of a switching type is disclosed in U.S. Pat. No. 3,617,641, issued Nov. 2, 1971 to James H. Fiet and entitled "STEREO MULTIPLEX DEMODULATOR" and a more detailed description thereof will be omitted.

The intermediate frequency signal as not amplitude limited obtained from the intermediate frequency amplifier 9 is applied to the signal converter 15 as a voltage signal $V_{IF}$ proportional to the electric field strength for reception. The signal converter 15 comprises a transistor 151, the emitter of which is connected to receive the above described voltage signal $V_{IF}$. The transistor 151 is coupled to short-circuit a resistor 155, which is connected in series with a resistor 154 to constitute a voltage divider. Accordingly, these two resistors 154 and 155 are connected in series and the junction of the series connection provides an output voltage, i.e. a control voltage $V_{CNT}$. A resistor 152 is connected between the emitter and base electrodes of the transistor 151 and the base electrode of the transistor is connected to the ground through a resistor 153. The circuit 15 provides a control voltage signal $V_{CNT}$ representing a discontinuous change as shown in FIG. 7 as a function of the voltage signal $V_{IF}$ as applied. More specifically, in the case where the voltage signal $V_{IF}$ is smaller than a predetermined value, the transistor 151 is non-conductive and accordingly a voltage signal $V_{IF}$ as voltage divided by the resistors 155 and 154 is obtained as a control voltage signal $V_{CNT}$. If and when the voltage signal $V_{IF}$ becomes larger than a predetermined value, the transistor 151 turns to a conductive state. Therefore, the resistor 155 connected between the emitter and collector electrodes of the transistor 151 is short-circuited by the transistor 151. Accordingly, the voltage signal $V_{IF}$ as voltage divided by the internal resistance of the transistor 151 and the resistor 154 is obtained as a control voltage signal $V_{CNT}$. The internal resistance of the transistor 151 is quite small and accordingly the control voltage signal $V_{CNT}$ rapidly increases as shown in FIG. 7. Thereafter the voltage $V_{CNT}$ increases in accordance with an increase of the voltage $V_{IF}$. One feature of the embodiment shown is that as shown in FIG. 7 the control voltage signal $V_{CNT}$ represents an abrupt, i.e. a discontinuous change.

The voltage signal $V_{CNT}$ representing the above described discontinuous change obtained from the signal converter 15 is applied to the base electrode of a controlling transistor 171 of the switching signal supply circuit 17. The emitter electrode of the control transistor 171 is connected to the base electrode of the constant current transistor 172 through a resistor and the base electrode of the transistor 172 is further connected to the ground through a diode 173. The constant current transistor 172 is aimed to determine an operating current of the transistors 175 and 176. The transistors 175 and 176 constitute the switching signal supply stage 174. The base electrodes of the transistors 175 and 176 are supplied with a subcarrier signal, i.e. a 38 kHz signal obtained from the 38 kHz signal generator 19 (FIGS. 4 and 5). Accordingly, the switching signal supply stage 174 controls the level of the 38 kHz signal, i.e. the subcarrier signal as a function of the magnitude of the control voltage signal $V_{CNT}$ being applied and the subcarrier signal the level of which is controlled is applied to the above described stereo decoder as a switching signal. Meanwhile, when the level of the subscriber signal is changed, the demodulation efficiency of the stereo decoder 13 is changed in accordance therewith and accordingly a change of stereo separation is caused. Therefore, the circuits 15 and 17 cooperates with each other to control the demodulation efficiency by the stereo decoder 13.

In operation, referring to FIGS. 8a, 8b and 9, the FIG. 6 embodiment will be described in detail. Now consider a case where the electric field strength of the signal received by the antenna 1 (FIG. 4) is sufficiently small. In such a case, the voltage signal $V_{IF}$ obtained from the intermediate frequency amplifier 9 is quite small and accordingly the control voltage signal $V_{CNT}$ is also small. Therefore, the control transistor 171 and the constant current transistor 172 included in the switching signal supply circuit 17 both become nonconductive. Accordingly, the transistors 175 and 176 of the switching signal supply stage 174 both become nonconductive and hence the stereo decoder 13 is not supplied with a 38 kHz signal. Accordingly, the respective transistor constituting the first and second differential switching stages 134 and 137 become a fully conductive state. Therefore, the stereo composite signal being applied is not subjected to any switching control and accordingly the same is withdrawn as the left channel signal and the right channel signal of the stereo decoder 13. In such a state a complete monaural state is achieved.

Figure 8A:
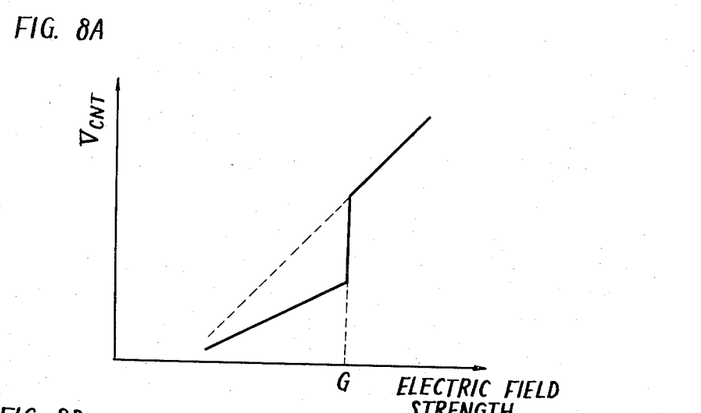

Now consider a case where the electric field strength of a signal being received has a certain magnitude and is smaller than a predetermined value (the point G in FIG. 8A). In such a case the voltage signal $V_{IF}$ supplied from the intermediate frequency amplifier 9 to the signal converter 15 also has a certain magnitude and accordingly the voltage signal $V_{IF}$ is obtained as a voltage signal $V_{CNT}$ voltage divided by means of the resistors 155 and 154. Therefore, in the case where the electric field strength is smaller than a predetermined value, the control voltage signal $V_{CNT}$ changes at a relatively low level as a function of the electric field strength. Accordingly, the level of the switching signal obtained from the switching signal supply circuit 17 also changes depending on the magnitude of the control voltage signal $V_{CNT}$. Therefore, in the range where the electric field strength is smaller than the G point (FIG. 8A), i.e. in the range V in FIG. 3, the control voltage $V_{CNT}$ changes in accordance with the electric field strength as shown in FIG. 8A and the stereo separation changes in accordance with the control voltage $V_{CNT}$ as shown in FIG. 8B.

Now consider a case where the electric field strength of a signal being received becomes so sufficiently large as to exceed the above described predetermined value. In such a case the control voltage signal $V_{CNT}$ obtained from the signal converter 15 rapidly increases responsive to conduction of the transistor 151 at the G point (FIG. 8A). Therefore, the base voltage of the control transistor 171 included in the switching signal supply circuit 171 also abruptly increases to become approximately equal to the voltage signal $V_{IF}$. Thereafter the control voltage signal $V_{CNT}$ also increases in accordance with the increase of the voltage signal $V_{IF}$ obtained from the intermediate frequency amplifier 9. On the other hand, when the base voltage of the control transistor 171 increases, the collector current of the constant current transistor 172 also increases. Accordingly, the level of the subcarrier, i.e. the 38 kHz switching signal, supplied from the switching signal supply stage 174 to the stereo decoder 13 also decreases. Therefore, the 38 kHz switching signal and the stereo composite signal obtained through the differential amplifying stage 131 are subjected to a multiplying operation at the first and second differential switching stages 134 and 137 of the stereo decoder 13. This means that the stereo composite signal is switched in such a state where complete stereo separation is not attained. As the magnitude of the control voltage signal $V_{CNT}$ increases, the operation enters into a more complete stereo state. When the level of the 38 kHz switching signal applied to the stereo decoder 13 reaches a predetermined value as large as 100 mVp-p, for example, thereafter the first and second differential switching stages 134 and 137 perform a complete switching operation. Therefore, in such a state stereo separation by the stereo decoder 13 becomes a possible maximum value inherent to the decoder 13.

Figure 8B:
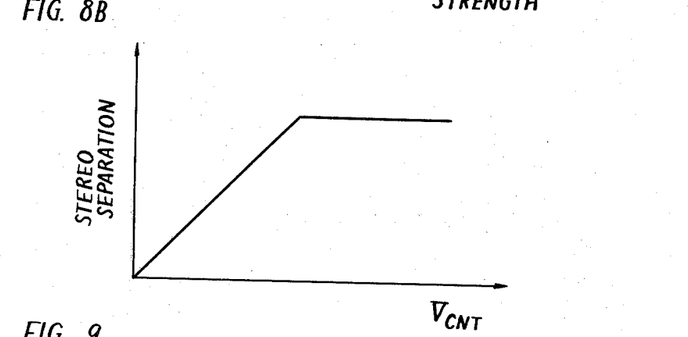
Figure 9:
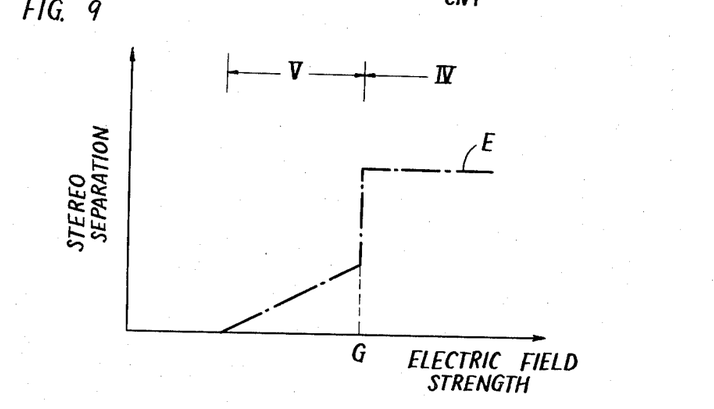

Such change of stereo separation is shown in FIGS. 8A and 8B. A relation of the stereo separation shown in FIGS. 8A and 8B with the electric field strength is shown in FIG. 9. The curve E shown in FIG. 9 is of the same as the curve E in FIG. 3. Referring to the curve E shown in FIG. 9 as well as FIG. 3, the above described operation will be briefly described.

If and when the electric field strength of a signal being received is within the range V smaller than a predetermined value (the G point in FIG. 8A), the control voltage signal $V_{CNT}$ changes at a relatively lower level in accordance with the electric field strength. Accordingly, the first and second differential switching stages 134 and 137 in the stereo decoder 13 (FIG. 6) function as a multiplier and the stereo separation changes in accordance with the voltage signal $V_{CNT}$. When the electric field strength reaches the G point (FIG. 8A), the control voltage signal $V_{CNT}$ abruptly increases as described previously. Accordingly, the stereo separation abruptly changes from a predetermined separation (say approximately 25 dB in FIG. 3) to a complete stereo state. In the range IV where the electric field strength exceeds the G point (FIG. 8A), the first and second differential switching stages 134 and 137 make a complete switching operation, so that the stereo separation is maintained in the possible maximum value (50 dB in FIG. 3) attained by the decoder.

On the other hand, as for a signal to noise ratio, in the range V in FIG. 3 (FIG. 9), i.e. in the range where the stereo separation changes in accordance with the electric field strength the signal to noise ratio is also improved as in the case of the prior art shown in FIG. 1. More specifically, in the range V, as the electric field strength decreases, the stereo separation comes to change from the above described predetermined value (approximately 25 dB) to the monaural state (0 dB) in accordance therewith and accordingly the signal to noise ratio is also improved. On the other hand, in the range IV of the electric field strength shown in FIGS. 3 and 9, a complete stereo state is attained. However, in the RANGE IV a change of the stereo separation leads to little improvement of the signal to noise ratio and accordingly in that range the signal to noise ratio is not drastically degraded as compared with the case shown in FIG. 1.

Figure 10:
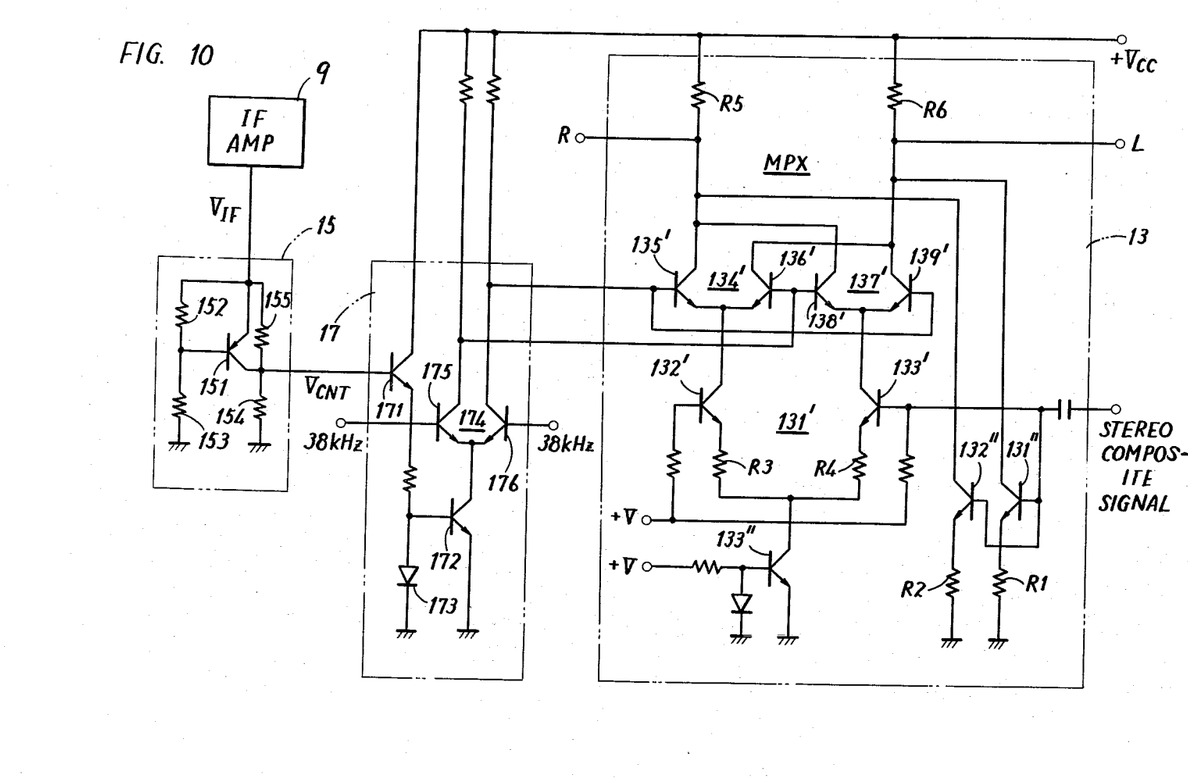
FIG. 10 is a schematic diagram of a major portion for explaining another embodiment of the present invention.

FIG. 10 is a schematic diagram of a major portion of another preferred embodiment of the present invention. The embodiment shown is substantially the same as the previously described FIG. 6 embodiment, except that the embodiment shown employs a stereo decoder 13 of a matrix type. The stereo decoder 13 of a matrix type receives at the input terminal thereof a stereo composite signal obtained from the FM detector 11. The stereo composite signal is amplified by a differential amplifier 131' including transistors 132' and 133' and is applied to a multiplying circuit MPX. The multiplying circuit MPX comprises a first differential circuit 134' including transistors 135' and 136' and a second differential circuit 137' including transistors 138' and 139'. The multiplying circuit MPX is further supplied with a stereo composite signal through transistorss 131" and 132". Accordingly, the multiplying circuit MPX demodulates a signal from the differential amplifying stage 131' in accordance with the level of the subcarrier signal, i.e. the 38 kHz signal obtained from the switching signal supply circuit 17 and matrixes the signals from the transistors 131" and 132", thereby to provide the left channel signal and the right channel signal. The transistor 133" serves as a constant current circuit for determining the operating current of the differential amplifying stage 131'. A matrixing ratio in such stereo decoder 13 is determined by the resistance values of the resistors R1 to R4. The stereo decoder of such matrix type is disclosed in U.S. Pat. No. 3,707,603 issued Dec. 26, 1978 to Allen LeRoy Limberg and entitled "FM STEREOPHONIC RECEIVER DETECTION APPARATUS AND DISABLING MEANS" and therefore a more detailed description thereof will be omitted. The FIG. 10 embodiment is also adapted to make substantially the same operation as that of the previously described FIG. 6 embodiment, as far as the signal converter 15 and the switching supply circuit 17 are concerned. Accordingly, the stereo separation in the stereo decoder 13 is controlled by the control voltage signal $V_{CNT}$ and as a result a discontinuous change as shown by the curve E in FIG. 3 results.

Figure 11:
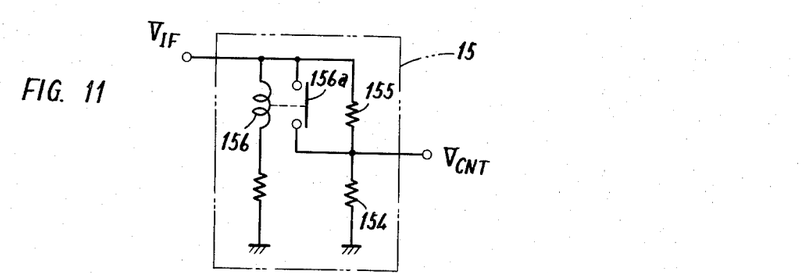
FIGS. 11 to 13 are schematic diagrams showing major portions of different embodiments of a signal converting circuit.
Figure 12:
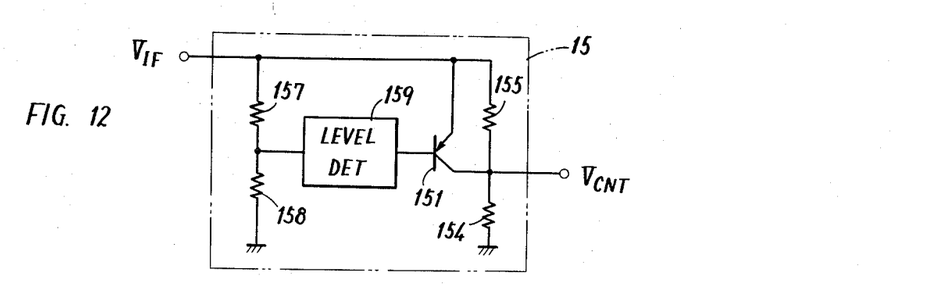
Figure 13:
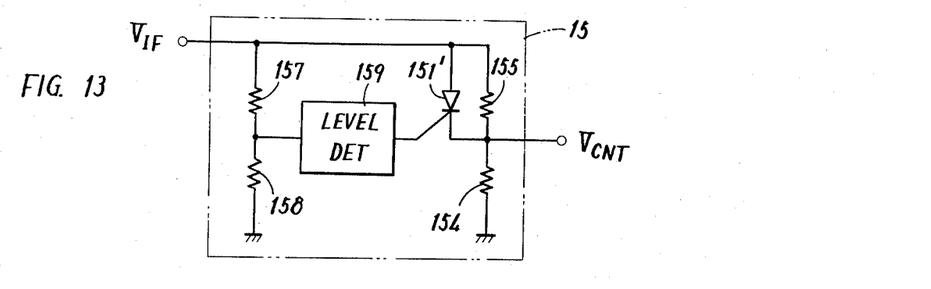

FIGS. 11 to 13 are schematic diagrams of different embodiments of the signal converter 15.

The FIG. 11 embodiment employs a relay 156 and a relay contact 156a in place of the transistor 151 in the FIG. 6 embodiment. When the signal from the voltage signal $V_{IF}$ obtained from the intermediate frequency amplifier 5 is small, the relay 156 is kept deenergized and the contact 161a is kept off. Accordingly, the output or the control voltage signal $V_{CNT}$ is obtained by dividing the voltage signal $V_{CNT}$ by means of the resistors 155 and 154. When the voltage $V_{IF}$ reaches a predetermined level, the relay 156 is energized and the contact 156a is turned on. Accordingly, as in the case of the previously described embodiment, the resistor 155 is short-circuited at that time and the control voltage $V_{CNT}$ abruptly increases to become substantially the same level as that of the voltage signal $V_{IF}$.

The FIG. 12 embodiment employs a level detector 159 of such as a Schmitt trigger circuit for the purpose of controlling the transistor 151 to be conductive or non-conductive. More specifically, the input of the level detector is supplied with the voltage signal $V_{IF}$ from the intermediate frequency amplifier 9 as voltage divided by means of the resistors 157 and 158. If and when the voltage at the junction of the series connection of the resistors 157 and 158 exceeds a predetermined threshold value, a voltage is obtained from the Schmitt trigger circuit, i.e. the level detector 157. Therefore, the transistor 151 is rendered conductive. Accordingly, even in the case of the FIG. 12 embodiment, when the voltage $V_{IF}$ reaches a predetermined value, the control voltage $V_{CNT}$ abruptly increases.

The FIG. 13 embodiment employs a switching element 151' of such as a silicon controlled rectifier in place of the transistor 151 of the previously described FIG. 12 embodiment. The FIG. 13 embodiment is substantially the same as the FIG. 12 embodiment, except for the above described respect.

Meanwhile, the above described embodiments utilized the intermediate frequency signal as not limited obtained from the intermediate frequency amplifier 9, i.e. the voltage signal $V_{IF}$, for the purpose of generating a signal having the magnitude associated with the level of the electric field strength of a signal being received. However, such a signal proportional to the level of the electric field strength may be a voltage signal obtained by detecting the level of the so called white noise and inverting the same, and may be obtained by utilizing other various well-known circuits. Furthermore, as is seen with reference to FIG. 3, the previously described embodiments have been adapted to control the stereo separation so that the signal to noise ratio may be approximately constant in the range V of the electric field strength. However, a change of the stereo separation in the range V, i.e. a manner of the change of the signal to noise ratio may be arbitrarily selected by a mere designing change. The present invention is adapted such that the stereo separation is abruptly degraded when the electric field strength becomes smaller than a predetermined value, so that a discontinuous change of the stereo separation is attained.

Although the above described embodiments were adapted to change the level of the 38 kHz signal for the purpose of changing the stereo separation, such an approach of controlling the input and output of the decoder as employed in the previously referenced U.S. Pat. No. 3,673,342 may be employed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A stereo demodulating circuit in an FM stereo receiver, comprising:
   level signal generating means for generating a level signal representative of electric field strength of a signal being received,
   control signal generating means responsive to said level signal for generating a control signal the magnitude of which abruptly changes to a first predetermined value when said electric field strength equals a second predetermined value and smoothly changes as said electric field strength decreases from said second predetermined value,
   decoder means responsive to said received signal and a signal derived from a pilot signal included in said received signal for demodulating said signal to provide a plurality of output signals, and
   separation control means responsive to said control signal and coupled to said decoder means for controlling the separation of said stereo output signals provided therefrom, whereby said signal separation is abruptly changed from the stereo state to a given state between a stereo state and a monaural state in accordance with said electric field strength and a continuous signal separation change is provided between said given state and said monaural state in accordance with said electric field strength.

2. A demodulating circuit in a stereo receiver in accordance with claim 1, wherein said control signal generating means comprises voltage generating means for generating a voltage of a magnitude substantially proportional to the level of the signal obtained from the level signal generating means, detecting means for detecting that said electric field strength has become smaller than said second predetermined value, and proportion changing means for changing said proportion of said generated voltage to said level signal magnitude as a function of the output of said detecting means.

3. A demodulating circuit in a stereo receiver in accordance with claim 2, wherein said voltage generating means comprises a voltage divider for receiving a signal from said level signal generating means and including a plurality of resistive elements connected, and said proportion changing means comprises resistance value changing means responsive to the output of said detecting means for changing the resistance value of at least one of said plurality of resistive elements.

4. A demodulating circuit in a stereo receiver in accordance with claim 3, wherein said resistance value changing means comprises short-circuiting means for short-circuiting at least one of said plurality of resistive elements.

5. A demodulating circuit in a stereo receiver in accordance with claim 4, wherein said short-circuiting means comprises a switching element coupled in parallel with said at least one of said plurality of resistive elements for being switchable responsive to the output of said detecting means.

6. A demodulating circuit in a stereo receiver in accordance with claim 5, wherein said switching element comprises a semiconductor element.

7. A demodulating circuit in a stereo receiver in accordance with any one of the preceding claims 2 to 6, wherein said detecting means comprises threshold detecting means for threshold detecting at a predetermined threshold value the signal obtained from said level signal generating means.

8. A demodulating circuit in a stereo receiver in accordance with claim 7, wherein said threshold detecting means comprises Schmitt circuit means.

9. A demodulating circuit in a stereo receiver in accordance with claim 7, wherein said threshold detecting means comprises a voltage responsive switching element.

10. A demodulating circuit in a stereo receiver in accordance with claim 9, wherein said voltage responsive switching element comprises a transistor.

11. A demodulating circuit in a stereo receiver in accordance with claim 1, wherein said separation control means comprises first means for maintaining said signal separation in a stereo state when said control signal obtained from said control signal generating means exceeds said predetermined value.

12. A demodulating circuit in a stereo receiver in accordance with claim 11, wherein said first means is adapted to maintain said signal separation to a possible maximum value inherent to said decoder means.

13. A demodulating circuit in a stereo receiver in accordance with claim 11, wherein said separation control means comprises second means for abruptly decreasing said signal separation to a predetermined value between said stereo state and said monaural state when said control signal obtained from said control signal generating means abruptly decreases to said predetermined value.

14. A demodulating circuit in a stereo receiver in accordance with claim 13, wherein said separation control means comprises third means for continuously changing said signal separation between said predetermined value and said monaural state as a function of said control signal when said control signal obtained from said control signal generating means becomes smaller than said predetermined value.

15. A demodulating circuit in a stereo receiver in accordance with any one of the preceding claims 11 to 14, wherein said signal being received comprises a suppressed carrier, said decoder means comprises carrier reproducing means for reproducing said suppressed carrier, and channel signal separating means responsive to the reproduced carrier obtained from said carrier reproducing means and a stereo composite signal for providing said respective channel signals, and said separation control means comprises carrier level controlling means for controlling the level of said reproduced carrier being supplied from said carrier reproduced means to said channel signal separating means.

16. A demodulating circuit in a stereo receiver in accordance with claim 15, wherein said channel signal separating means is of a switching type.

17. A demodulating circuit in a stereo receiver in accordance with claim 15, wherein said channel signal separating means is of a matrix type.

18. The apparatus according to claim 1 wherein said separation control means acts on an input path to said decoder means.

19. The apparatus according to claim 1 wherein said separation control means acts on the output path of said decoder means.

* * * * *